US012576753B2

(12) United States Patent
Kansal et al.

(10) Patent No.: US 12,576,753 B2
(45) Date of Patent: Mar. 17, 2026

(54) ENTRY AND EGRESS SYSTEM FOR A VEHICLE

(71) Applicant: GM Global Technology Operations LLC, Detroit, MI (US)

(72) Inventors: Siddhant Kansal, Hazel Park, MI (US); Gregory Koch, Harrison Township, MI (US); Ross A. Pitcole, Flint, MI (US); Shabbir Ezzy, Royal Oak, MI (US); Patrick Minjeur, Sterling Heights, MI (US); Nilesh D. Mankame, Ann Arbor, MI (US); Thomas A. Barth, Macomb Township, MI (US); Daniel W. Booth, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 496 days.

(21) Appl. No.: 18/181,840

(22) Filed: Mar. 10, 2023

(65) Prior Publication Data

US 2024/0300387 A1 Sep. 12, 2024

(51) Int. Cl.
*B60N 2/02* (2006.01)

(52) U.S. Cl.
CPC .......... *B60N 2/0244* (2013.01); *B60N 2/0256* (2023.08); *B60N 2/0268* (2023.08)

(58) Field of Classification Search
CPC ...... B60N 2/0256; A61G 3/062; B60P 1/4407
See application file for complete search history.

(56) References Cited

U.S. PATENT DOCUMENTS

| | | | | |
|---|---|---|---|---|
| 5,150,659 A * | 9/1992 | Bickel | B61D 23/02 | 280/166 |
| 5,474,353 A * | 12/1995 | Koester | B60N 2/14 | 297/344.21 |
| 5,542,811 A * | 8/1996 | Vartanian | A61G 3/062 | 414/921 |
| 7,207,765 B1 * | 4/2007 | Egan | A61G 3/062 | 414/539 |
| 8,033,605 B2 * | 10/2011 | Miura | B60N 2/2893 | 297/344.14 |

(Continued)

FOREIGN PATENT DOCUMENTS

DE 8815282 U1 2/1989

OTHER PUBLICATIONS

"Adapt Solutions LINK Handicap Mobility Wheelchair Transfer Seat For Cars, Trucks, Vans, SUVs". Youtube. Accessed Jan. 31, 2023 from the World Wide Web: https://www.youtube.com/watch?v=507BfkrTEtE.

*Primary Examiner* — Jonathan Snelting
(74) *Attorney, Agent, or Firm* — CANTOR COLBURN LLP

(57) ABSTRACT

An entry/egress system for a vehicle includes a housing mountable to a structural member in the vehicle. An actuator is arranged at the housing. The actuator is connectable to a source of electrical power in the vehicle. A lift mechanism is operatively connected to the actuator. A support member is operatively connected to the lift mechanism. The support member is selectively shiftable between a user entry position and a user egress position. A control system is operatively connected to the actuator. The control system is operable to shift the support member to one of the user entry position and the user egress position.

20 Claims, 14 Drawing Sheets

(56) References Cited

U.S. PATENT DOCUMENTS

| | | | | |
|---|---|---|---|---|
| 9,114,731 | B2 * | 8/2015 | Horiguchi | B60N 2/4214 |
| 9,358,905 | B2 | 6/2016 | Weersink | |
| 9,849,046 | B2 * | 12/2017 | Misonou | A61G 3/062 |
| 9,918,885 | B2 * | 3/2018 | Soklaski | B60P 1/4421 |
| 2011/0280700 | A1 | 11/2011 | Uttech et al. | |
| 2023/0129501 | A1 * | 4/2023 | Sasaki | B60N 2/245<br>296/67 |

* cited by examiner

ENTRY AND EGRESS SYSTEM FOR A VEHICLE

INTRODUCTION

The subject disclosure relates to the art of vehicles and, more particularly, to an entry and egress system for a vehicle.

Most vehicles will fall into one of three passenger compartment entry categories. Step up and in, step down and in, and step over and into a passenger compartment. Egress would be in an opposite direction. For example, a step up and in becomes a step down, a step down and in becomes a step up, and a step over and in becomes a step out. The step up and the step down, regardless of direction, may be difficult operations for certain individuals.

Individuals with disabilities, either permanent or temporary, may find manipulating themselves down and into or up and into a passenger compartment difficult. Likewise, egress from the passenger compartment may also pose a physical challenge to those same individuals. Accordingly, it is desirable to provide a system for facilitating entry into and/or egress from a vehicle. Further, it is desirable to provide a system for facilitating entry into and/or egress from a vehicle that may be removed and/or relocated depending upon need.

SUMMARY

An entry/egress system for a vehicle, in accordance with a non-limiting example, includes a housing mountable to a structural member in the vehicle. An actuator is arranged at the housing. The actuator is connectable to a source of electrical power in the vehicle. A lift mechanism is operatively connected to the actuator. A support member is operatively connected to the lift mechanism. The support member is selectively shiftable between a user entry position and a user egress position. A control system is operatively connected to the actuator. The control system is operable to shift the support member to one of the user entry position and the user egress position.

In addition to one or more of the features described herein a transfer board is coupled to the support member.

In addition to one or more of the features described herein the transfer board is selectively rotatable relative to the support member.

In addition to one or more of the features described herein a transfer board actuator is connected to the transfer board.

In addition to one or more of the features described herein the transfer board actuator is operable to rotate the transfer board between a stowed position and a user receiving position, and a user transfer position.

In addition to one or more of the features described herein the control system includes a wireless sensor configured to detect a vehicle remote entry member.

In addition to one or more of the features described herein the support member is a horizontal structural member and the lift mechanism includes a scissor lift having a base mounted to the horizontal structural member.

In addition to one or more of the features described herein the housing comprises a flexible cover surrounding the scissor lift.

A vehicle, in accordance with a non-limiting example, includes a body including a structural member and a passenger compartment defined within the body. The passenger compartment includes a seat arranged adjacent to the structural member. An entry/egress system is arranged adjacent to the seat for facilitating entry into and egress from the passenger compartment. The entry/egress system includes a housing mounted to the structural member. An actuator is arranged at the housing. The actuator is connected to a source of electrical power in the vehicle. A lift mechanism is operatively connected to the actuator. A support member is operatively connected to the lift mechanism. The support member is selectively shiftable between a user entry position and a user egress position. A control system is operatively connected to the actuator. The control system is operable to shift the support member to one of the user entry position and the user egress position.

In addition to one or more of the features described herein a transfer board is coupled to the support member.

In addition to one or more of the features described herein the transfer board is selectively rotatable relative to the support member.

In addition to one or more of the features described herein a transfer board actuator is connected to the transfer board.

In addition to one or more of the features described herein the transfer board actuator is operable to rotate the transfer board between a stowed position and a user receiving position, and a user transfer position.

In addition to one or more of the features described herein the control system includes a wireless sensor configured to detect a vehicle remote entry member.

In addition to one or more of the features described herein the support member is a horizontal structural member and the lift mechanism includes a scissor lift having a base mounted to the horizontal structural member.

In addition to one or more of the features described herein the housing comprises a flexible cover surrounding the scissor lift.

A method of facilitating entry into and egress from a vehicle, in accordance with a non-limiting example, includes detecting a user accessing the vehicle, moving a support member to a first position spaced from a seat surface of a vehicle seat a selected distance allowing the user to engage with a transfer board connected to the support member, and shifting the support member to a second position placing the transfer board substantially co-planar with the seat surface allowing the user to transfer into the vehicle seat.

In addition to one or more of the features described herein moving the support member includes activating a lift mechanism mounted to a vehicle support surface in response to detecting the user accessing the vehicle.

In addition to one or more of the features described herein moving the support member to the first position includes rotating the transfer board in a first direction relative to the vehicle.

In addition to one or more of the features described herein shifting the support member to a ready position including rotating the transfer board in a second direction that is opposite the first direction.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
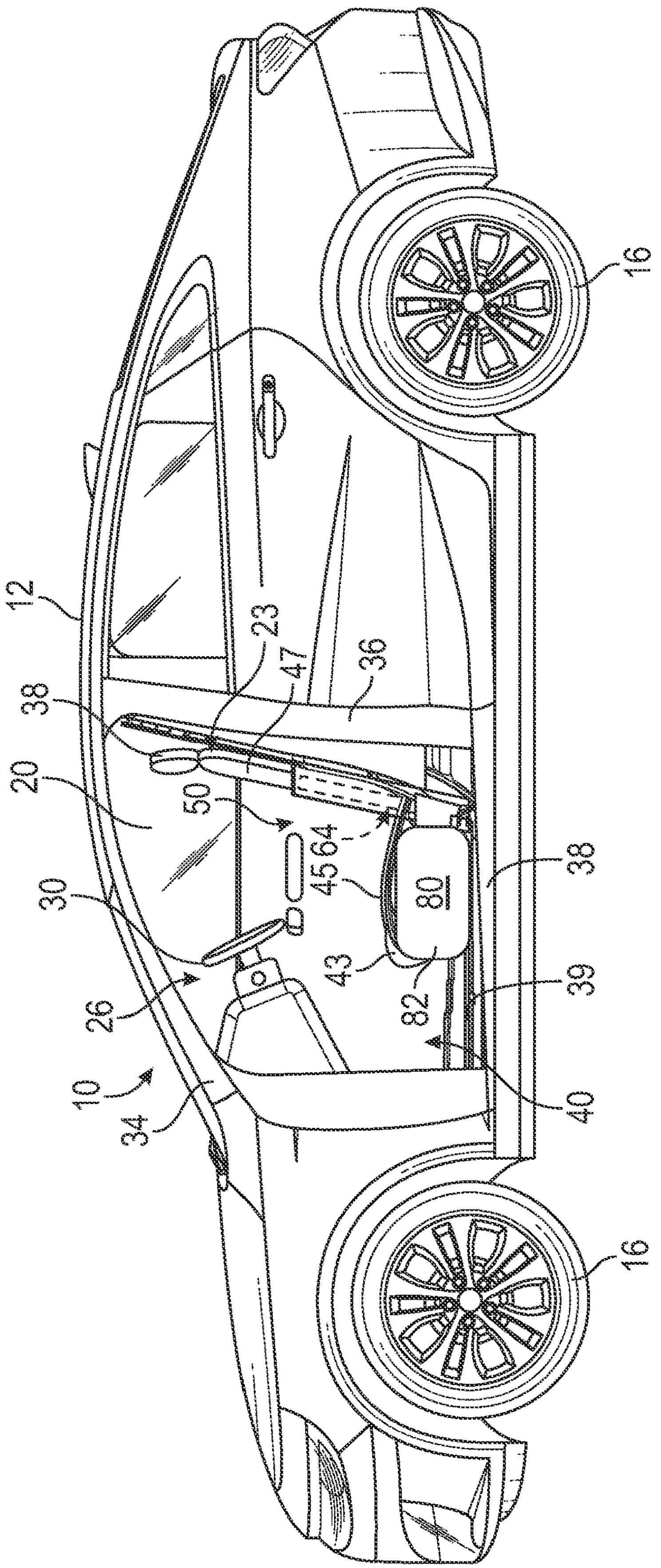
FIG. 1 is a side view of a vehicle including an entry and egress system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23. Seat 23 is positioned behind a dashboard 26. A steering control system 30 is arranged between seat 23 and dashboard 26.

Figure 2:
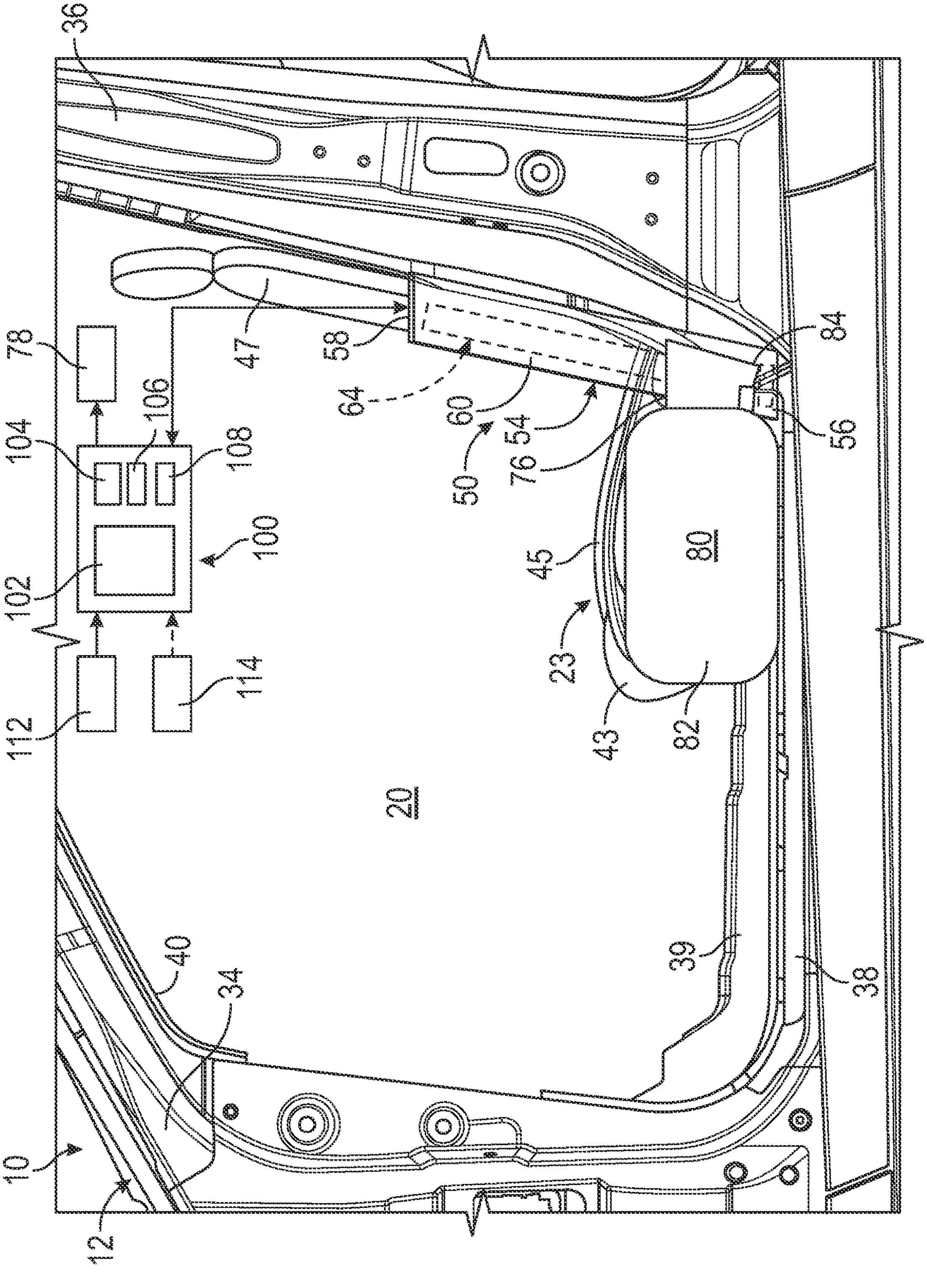
FIG. 2 is a side view of the entry and egress system in a stowed position, in accordance with a non-limiting example.

Referring to FIG. 2 and with continued reference to FIG. 1, body 12 includes a plurality of structural members including a first structural pillar 34 (i.e., an A-Pillar), and a second structural pillar 36 (i.e., a B-Pillar). First structural pillar 34 is connected to second structural pillar 36 through a substantially horizontal structural member 38 that supports a floor pan (not separately labeled). First structural pillar 34, second structural pillar 36, and substantially horizontal structural member 38, together with a roof support member (also not separately labeled) define an entry opening 40 for passenger compartment 20. Entry opening 40 is selectively accessed through a door (not shown).

Seat 23 includes a seat base 43 supported on floor pan 39. Seat base 43 includes a seat surface 45. A seat back 47 is pivotally connected to seat base 43. In a non-limiting example, vehicle 10 includes an entry/egress system 50 that helps an occupant into and/or out from seat base 43. Entry/egress system 50 includes a housing 54 mounted to second structural pillar 36. At this point, it should be understood that housing 54 may be mounted to various surfaces of vehicle 10 and should not be considered to be limited to the mounting location shown. As shown in FIG. 2, housing 54 includes a first end 56, a second end 58, and an intermediate portion 60. Intermediate portion 60 extends between first end 56 and second end 58. A guide track 62 is defined along intermediate portion 60 as shown in FIG. 3.

In a non-limiting example, a lift mechanism 64 is arranged in housing 54. Lift mechanism 64 includes a first end portion 67 and a second end portion 69. First end portion 67 is arranged adjacent to first end 56 of housing 54 and second end portion 69 is arranged adjacent to second end 58 of housing 54. A support member 72 is operatively connected to lift mechanism 64 via a shuttle 76. Shuttle 76 is operatively connected to an actuator 78 that, in the non-limiting example shown, is arranged in housing 54. Of course, other systems may be used to translate shuttle 76 along guide track 62. When actuator 78 is activated, support member 72 may translate between first end portion 67 and second end portion 69 with shuttle 76 as will become more fully evident herein. Thus, it should be understood that lift mechanism 64 should be understood to both raise and lower support member 72.

In a non-limiting example, a transfer board 80 is coupled to support member 72. In a non-limiting example, transfer board 80 includes a transfer surface 82 and may pivot about support member 72 so as to aid in a user's transfer into and out from seat 23. A transfer board actuator 84 is coupled between transfer board 80 and support member 72. A control system 100 (FIG. 2) is operatively coupled to lift mechanism 64. Control system 100 includes a central processing unit 102, a non-volatile memory 104, a lift mechanism control module 106, and a wireless sensor 108. A vehicle mounted actuator or switch 112 is coupled to control system 100. Further, a wireless remote entry member or fob 114 may connect with control system 100 via wireless sensor 108. It should be understood that other wireless interfaces, such as through a smart phone, a smart watch and the like are also contemplated.

Figure 3:
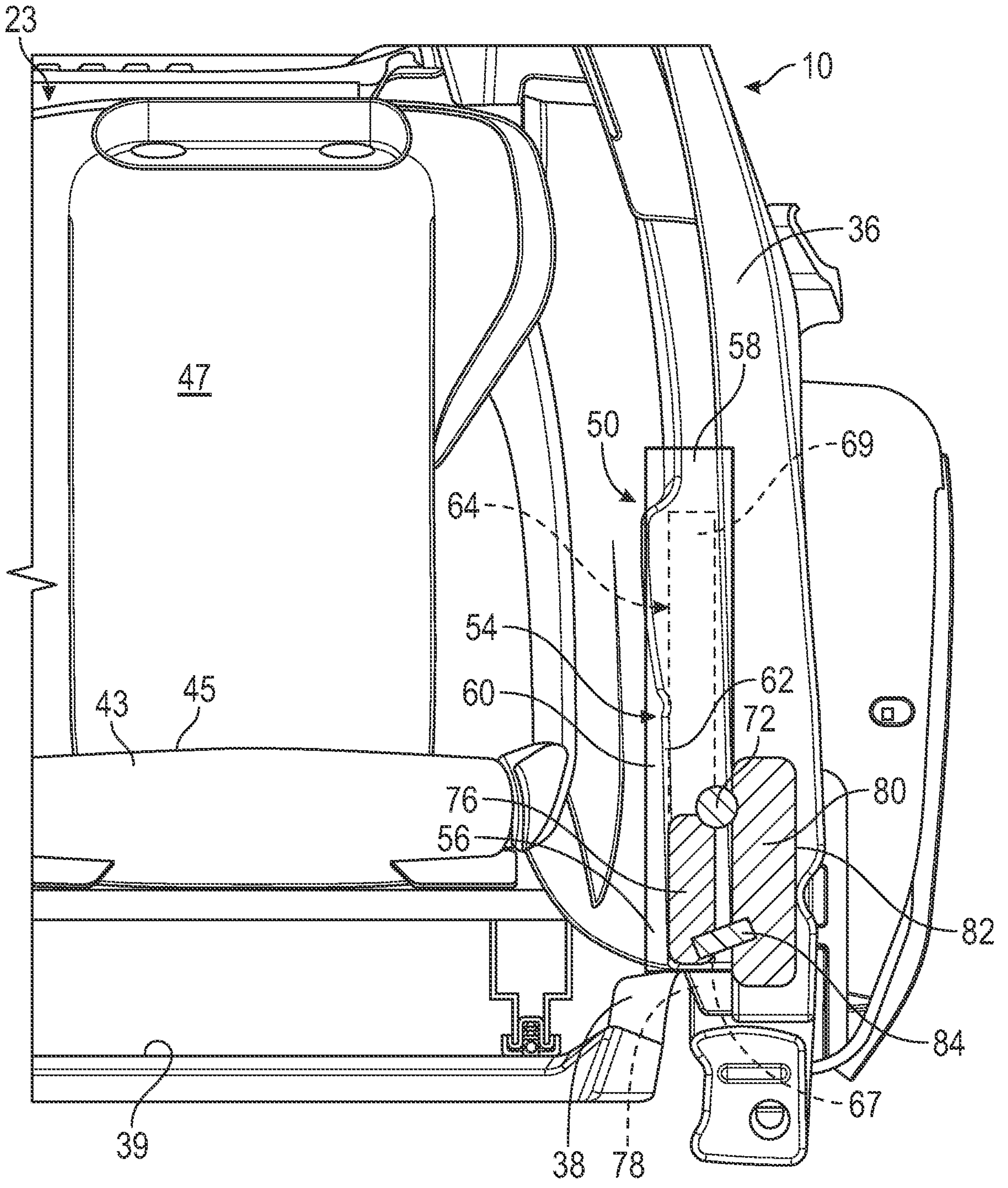
FIG. 3 is a front view of the entry and egress system of FIG. 2, in accordance with a non-limiting example.
Figure 4:
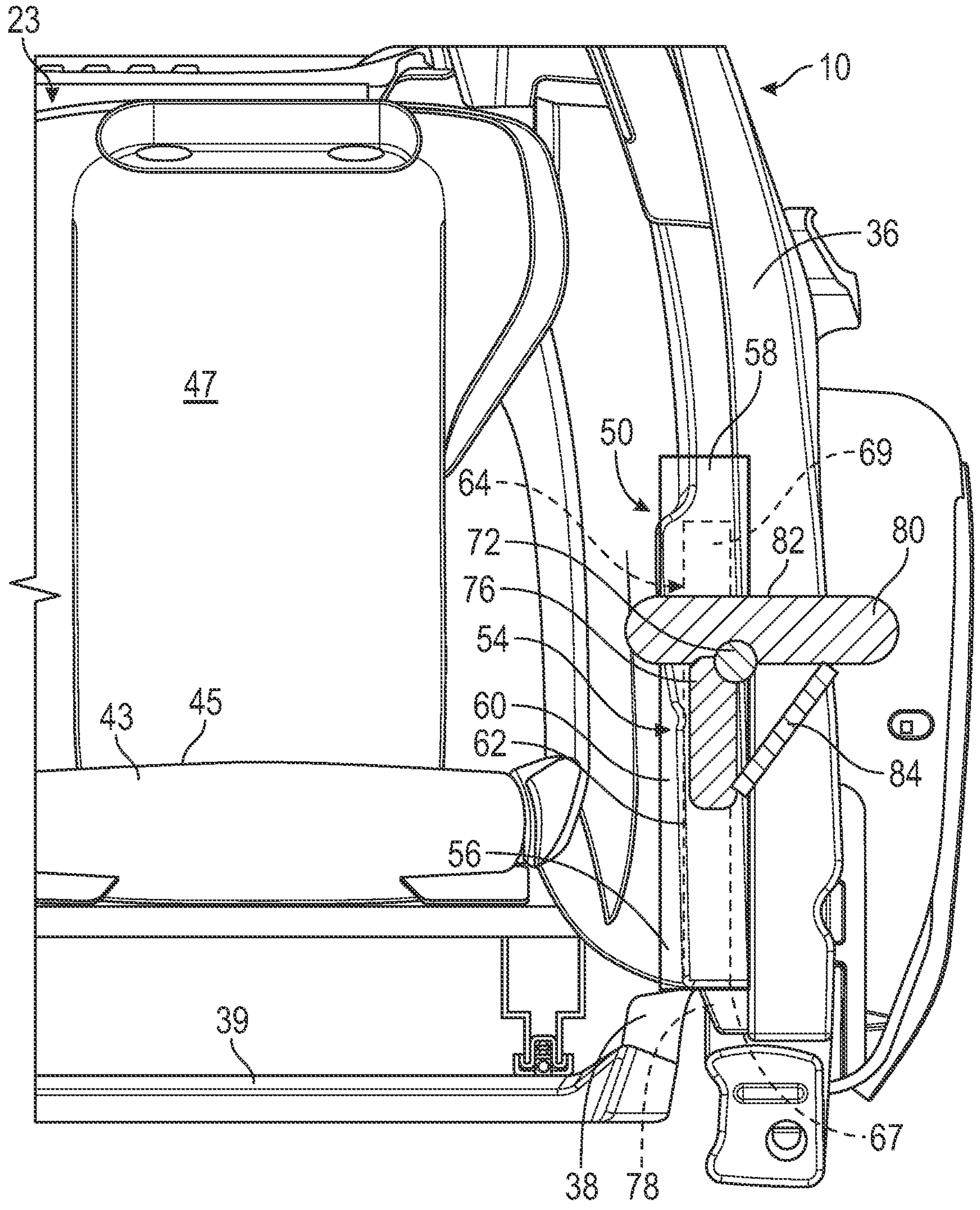
FIG. 4 is a front view of the entry and egress system of FIG. 3 moving toward an occupant receiving position, in accordance with a non-limiting example.
Figure 5:
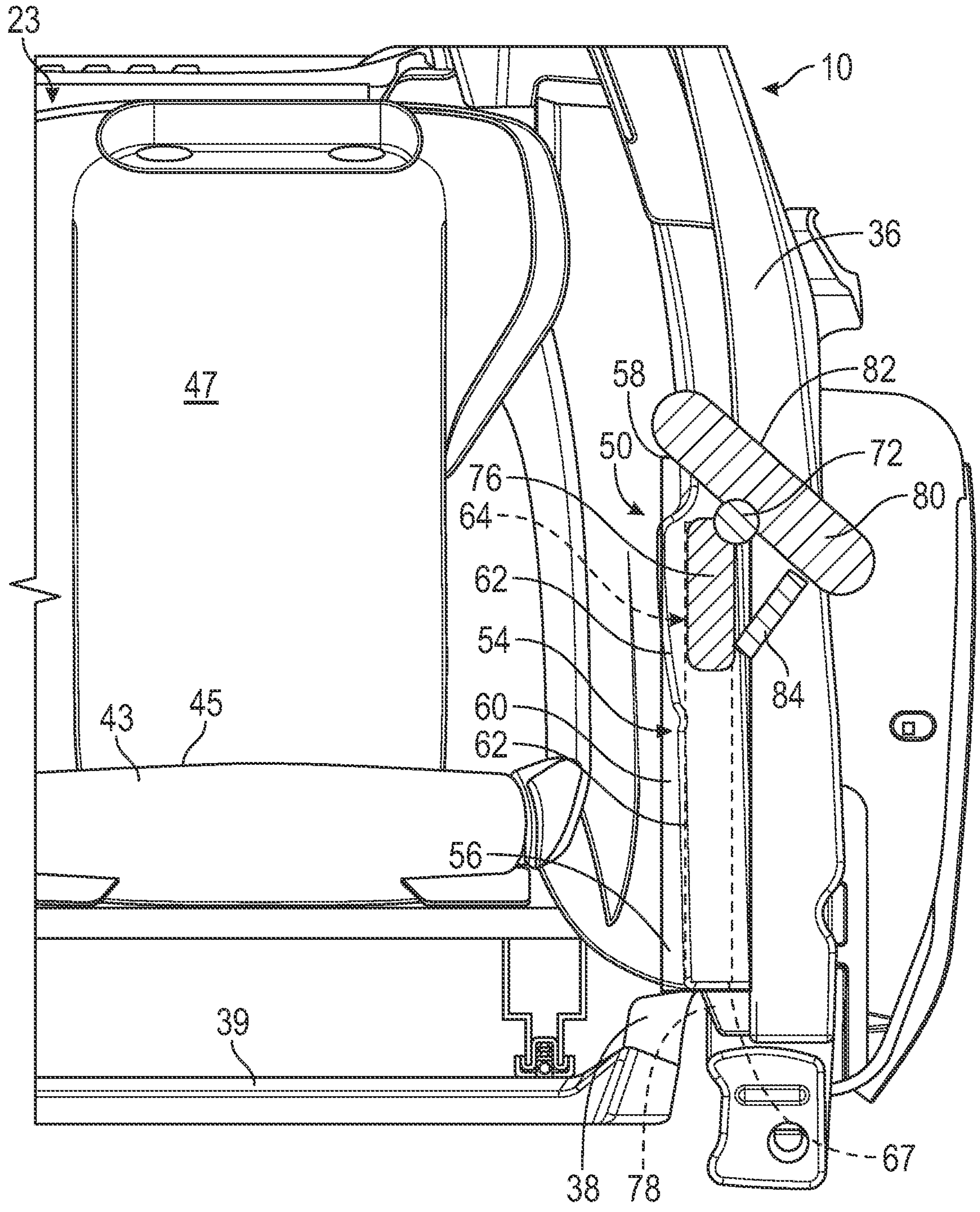
FIG. 5 is a front view of the entry and egress system of FIG. 4 in the occupant receiving position, in accordance with a non-limiting example.

In accordance with a non-limiting example, entry/egress system 50 positions lift mechanism 64 in a stowed configuration as shown in FIGS. 2 and 3 when a user is not entering and/or exiting vehicle 10. When assisted entry is requested, a user may engage actuator 112 or use wireless remote entry member 114 to activate lift mechanism 64. When activated, actuator 78 shifts shuttle 76 from the stowed configuration (FIG. 3) to a pre-entry position (FIG. 4). In the pre-entry position, transfer surface 82 is rotated from a vertical, storage configuration, to a horizontal, pre-entry position and raised in a first direction to a first position at a first selected distance above seat surface 45. Of course, it should be understood that rotation of transfer board 80 may occur while being shifted and not necessarily at an end point or a starting point. As shown in FIG. 5, transfer board 80 may be further rotated to a user receiving position in which transfer surface 82 is angled outwardly.

Figure 6:
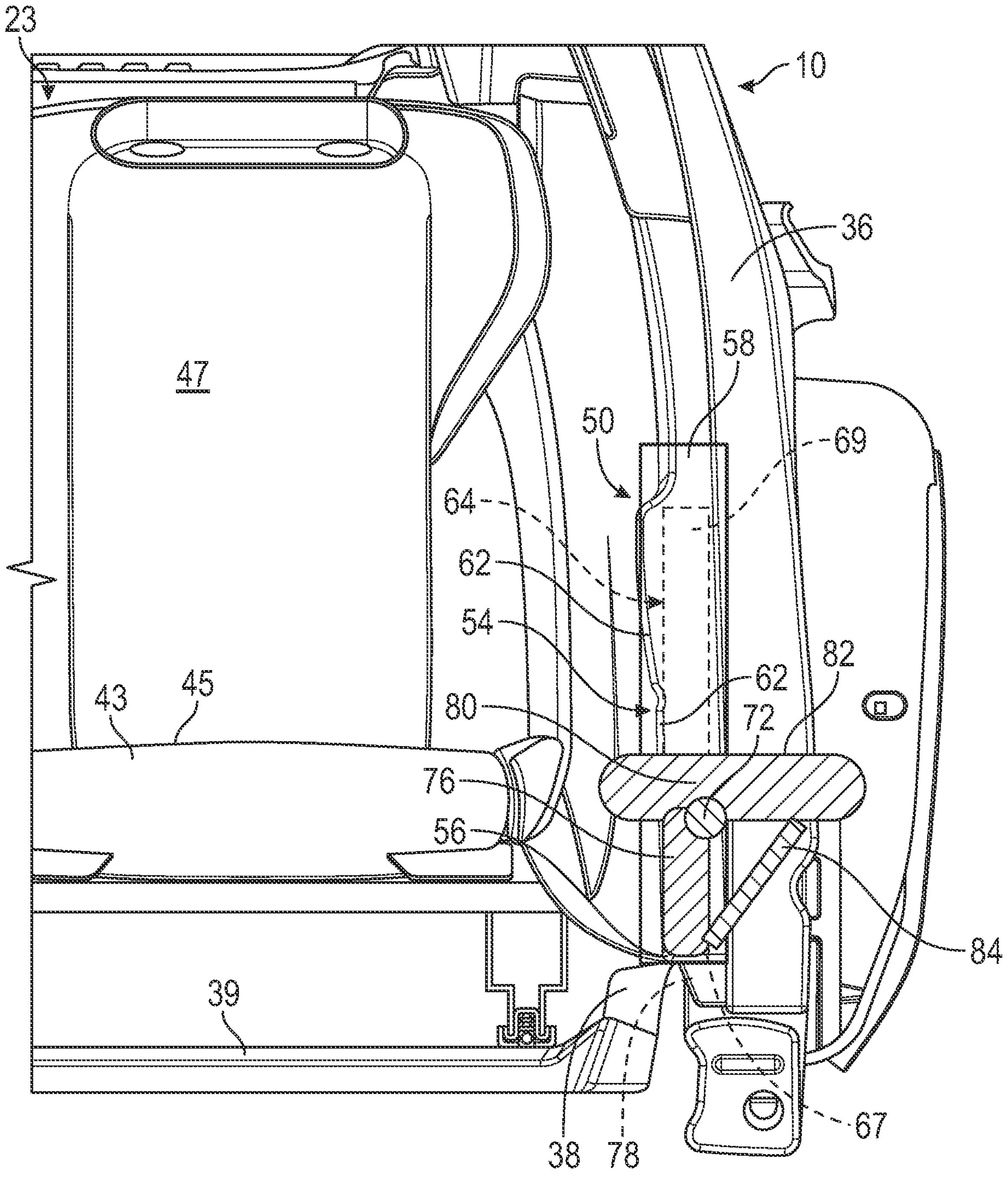
FIG. 6 is a front view of the entry and egress system of FIG. 5 in an occupant transfer position, in accordance with a non-limiting example.

At this point, a user may rest on transfer surface 82 and mount transfer board 80. Transfer board 80 may be rotated back such that transfer surface 82 is generally horizontal (FIG. 4), and shuttle 76 lowered in a second direction to a second position as shown in FIG. 6. Lift mechanism control module 106 positions transfer surface 82 to be substantially co-planar with seat surface 45 at an occupant entry position. At this point, the user may simply slide over onto seat 23 with minimal effort, and interact with vehicle 10. Once in seat 23, entry/egress system 50 may be returned to the stowed configuration (FIG. 3) through an interaction with actuator 112, or following a predetermined period of time following the transfer. Egress from the vehicle is the reverse of entry.

It should be understood that the particular angle of transfer board 80 in the stowed configuration, the pre-entry configuration, and the user receiving configuration are merely exemplary and could vary depending upon user preferences. Further, it should be understood that position, including height and angle of transfer board 80 in any configuration associated with one or more users may be programmed into non-volatile memory 104 and recalled as desired. Further, it should be understood that movement of transfer board 80 may be associated with an energy harvesting or capture system. Energy may be captured as transfer board 80 is lowered with the weight of an occupant may be used in vehicle 10 for a variety of purposes including reducing an amount of work required to lift a user on transfer board 80.

Figure 7:
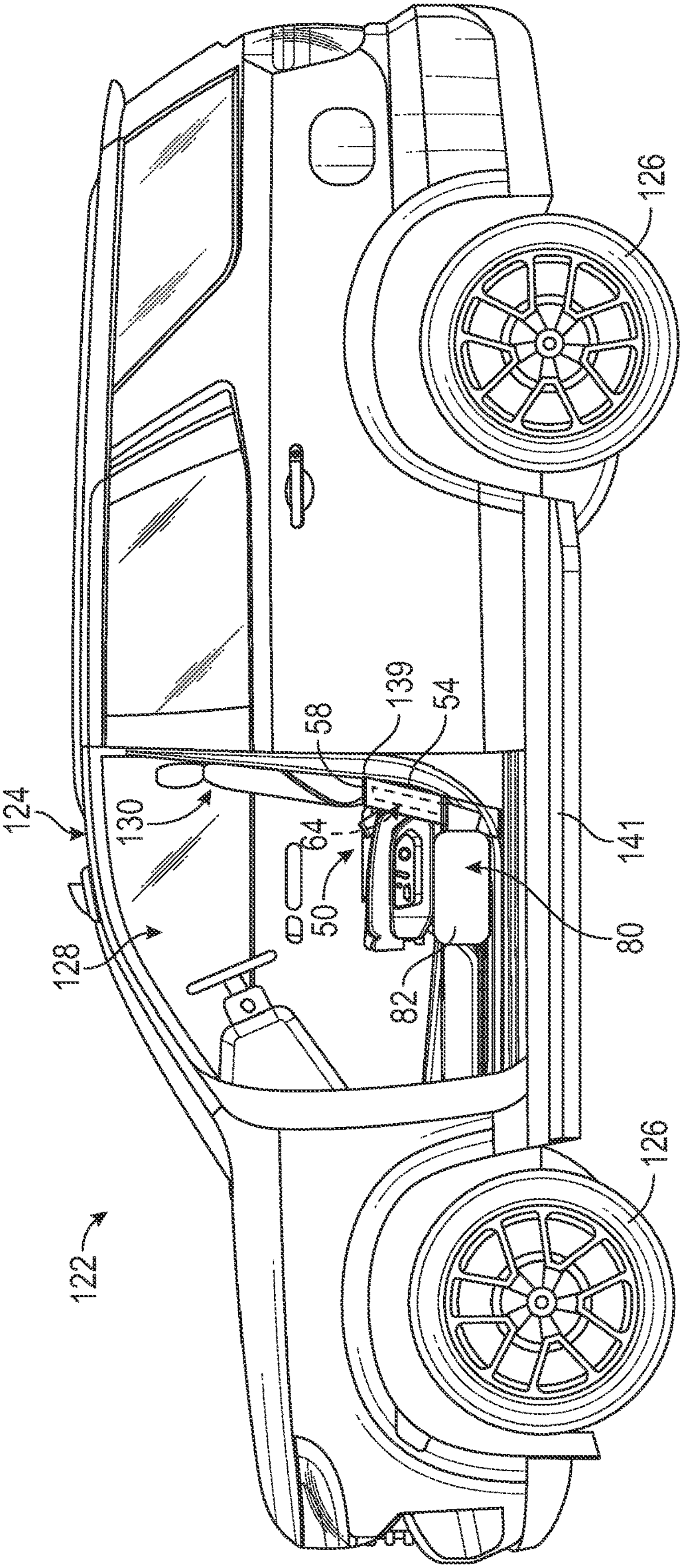
FIG. 7 is a side view of a vehicle including an entry and egress system, in accordance with another non-limiting example.
Figure 8:
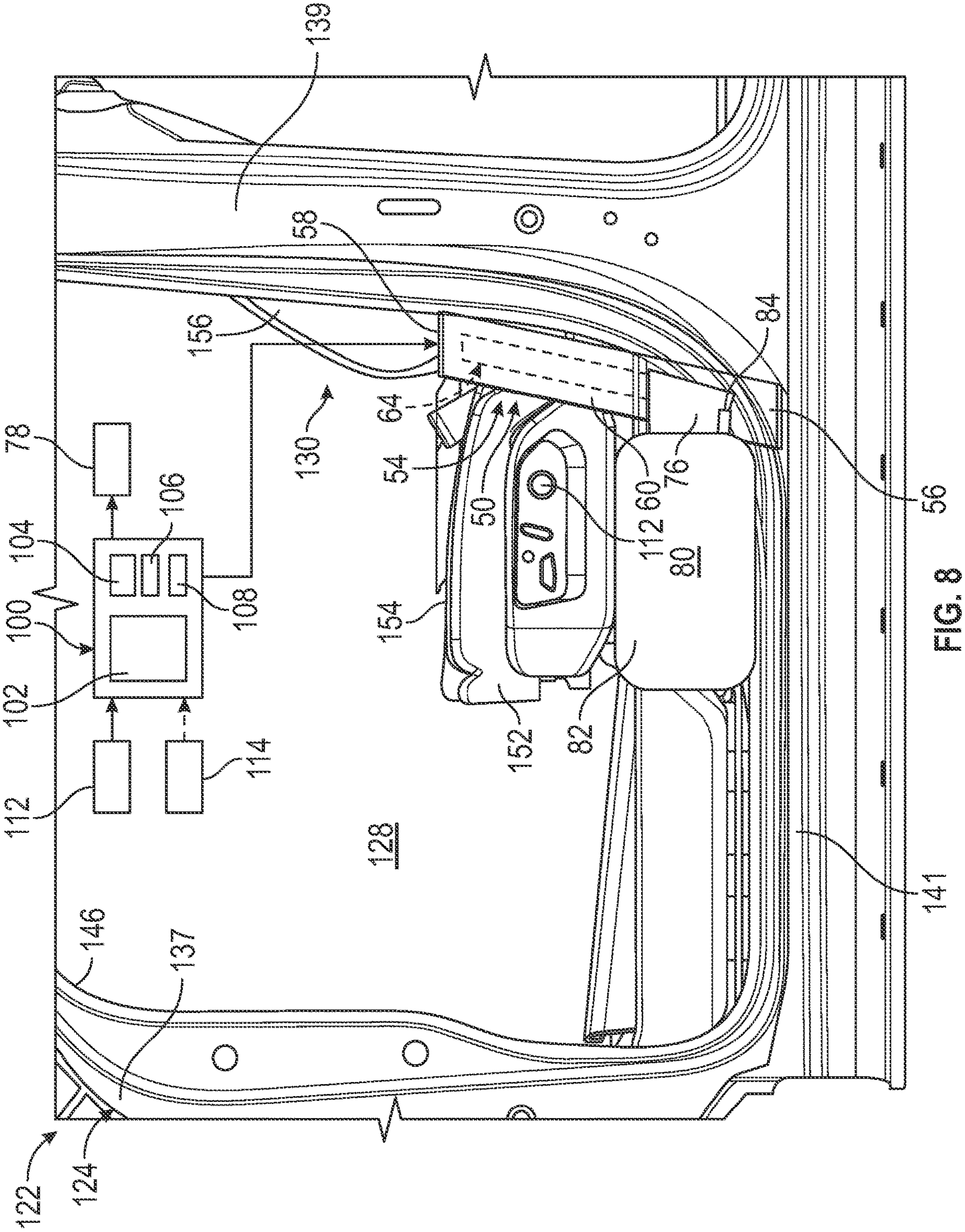
FIG. 8 is a side view of the entry and egress system of FIG. 7 in accordance with a non-limiting example.

Reference will now follow to FIG. 7 and FIG. 8 in describing entry/egress system 50 in accordance with another non-limiting example. As shown in FIG. 7, a vehicle 122 includes a body 124 supported on a plurality of wheels 126. At least two of the plurality of wheels 126 are steerable. Body 124 defines, in part, a passenger compartment 128 having seats, one of which is indicated at 130. Vehicle 10 is shown in the form of a sport utility vehicle or SUV having a ground clearance that is higher than that provided by a standard passenger vehicle and, by extension, a seat height above ground that is higher than a standard passenger vehicle. As such, and often times a user is required to step up and into passenger compartment 128. In this case, lift mechanism 64 may also help the user with the transition between an entry and egress position.

As shown in FIG. 8, body 124 includes a plurality of structural support members including a first structural pillar 137 (i.e., an A-Pillar), and a second structural pillar 139 (i.e., a B-Pillar). First structural pillar 137 is connected to second structural pillar 139 through a substantially horizontal structural member 141 that supports a floor pan (not separately labeled). First structural pillar 137, second structural pillar 139, and substantially horizontal structural member 141, together with a roof support member (also not separately labeled) define an entry opening 146 for passenger compartment 128. In a manner similar to that described herein, entry/egress system 50 is mounted to second structural pillar 139.

Figure 9:
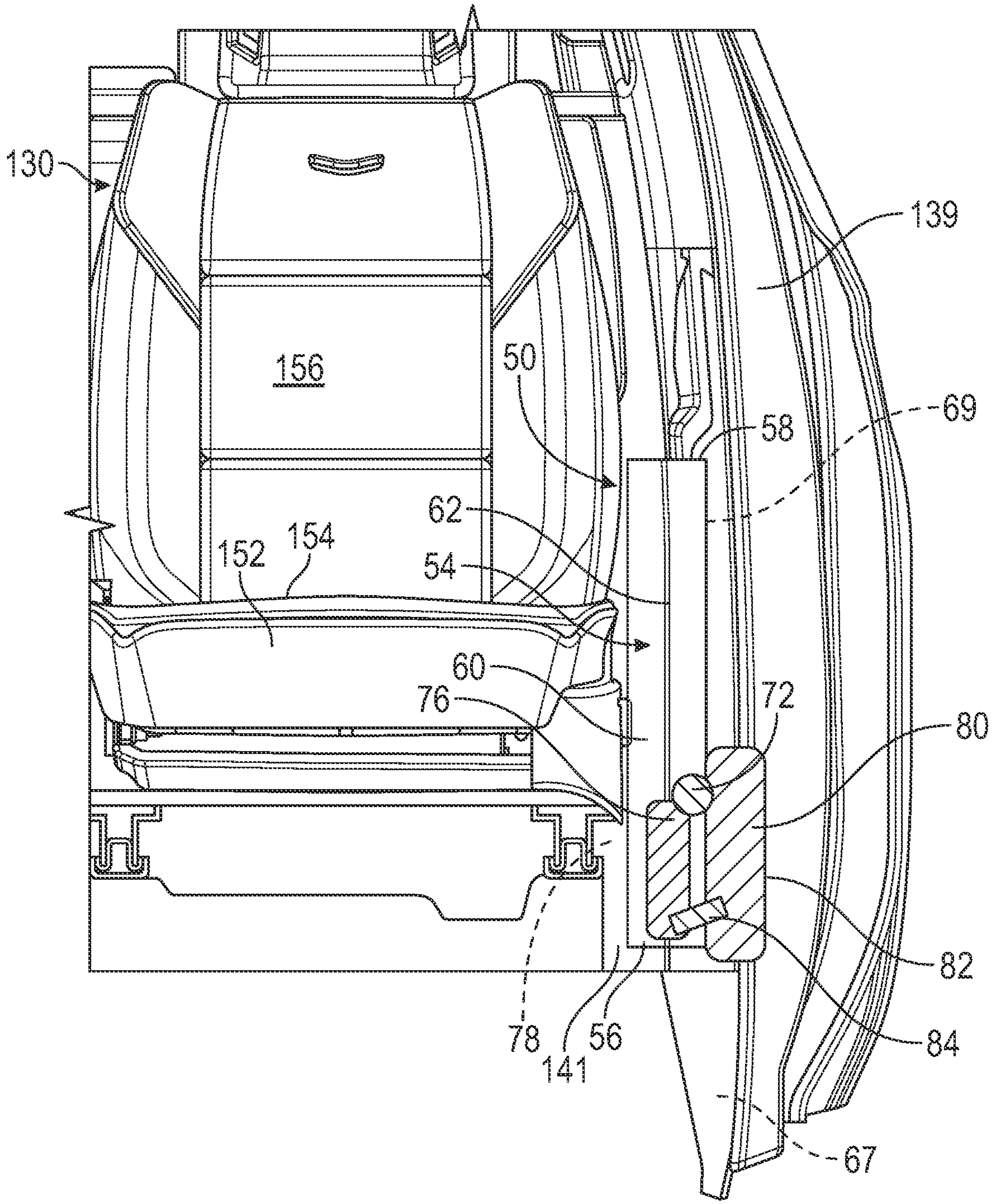
FIG. 9 is a front view of the entry and egress system of FIG. 7, in accordance with a non-limiting example.
Figure 10:
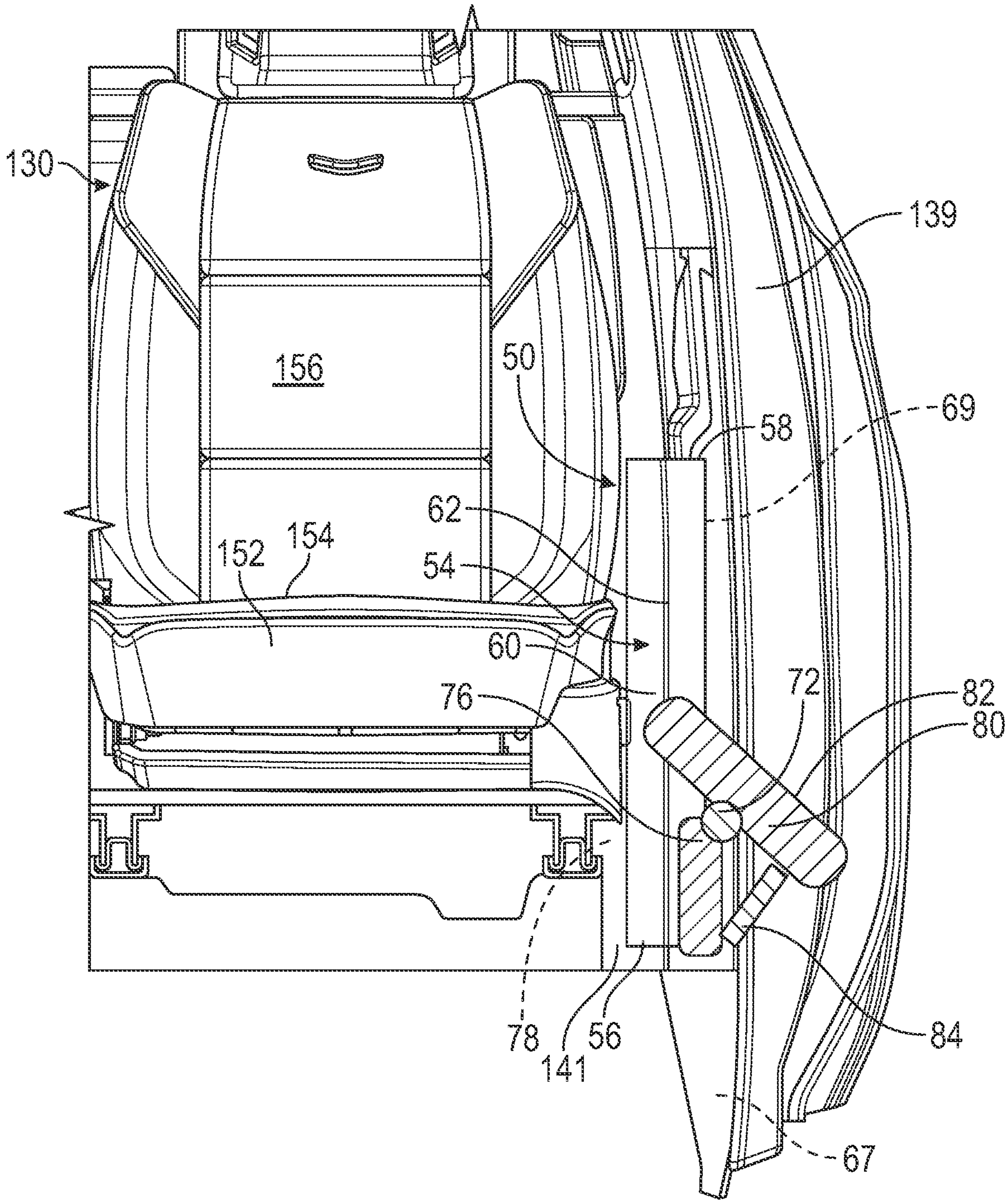
FIG. 10 is a front view of the entry and egress system of FIG. 9 in the occupant receiving position, in accordance with a non-limiting example.

In accordance with a non-limiting example, entry/egress system 50 positions lift mechanism 64 in a stowed configuration as shown in FIGS. 8 and 9 when a user is not entering and/or exiting vehicle 10. While shown as being arranged alongside seat base 152 when stowed, transfer board 80 may also be arranged below seat 130. When assisted entry is requested, a user may engage actuator 112 or use remote entry member 114 to activate lift mechanism 64. When activated, actuator 78 shifts shuttle 76 from the stowed configuration (FIG. 9) to a pre-entry position (FIG. 10). In the pre-entry position, transfer surface 82 is rotated from a vertical, storage configuration, to the user receiving position and lowered to a position below seat surface 154. Of course, it should be understood that rotation of transfer board 80 may occur while being shifted and not necessarily at an end point or a starting point.

Figure 11:
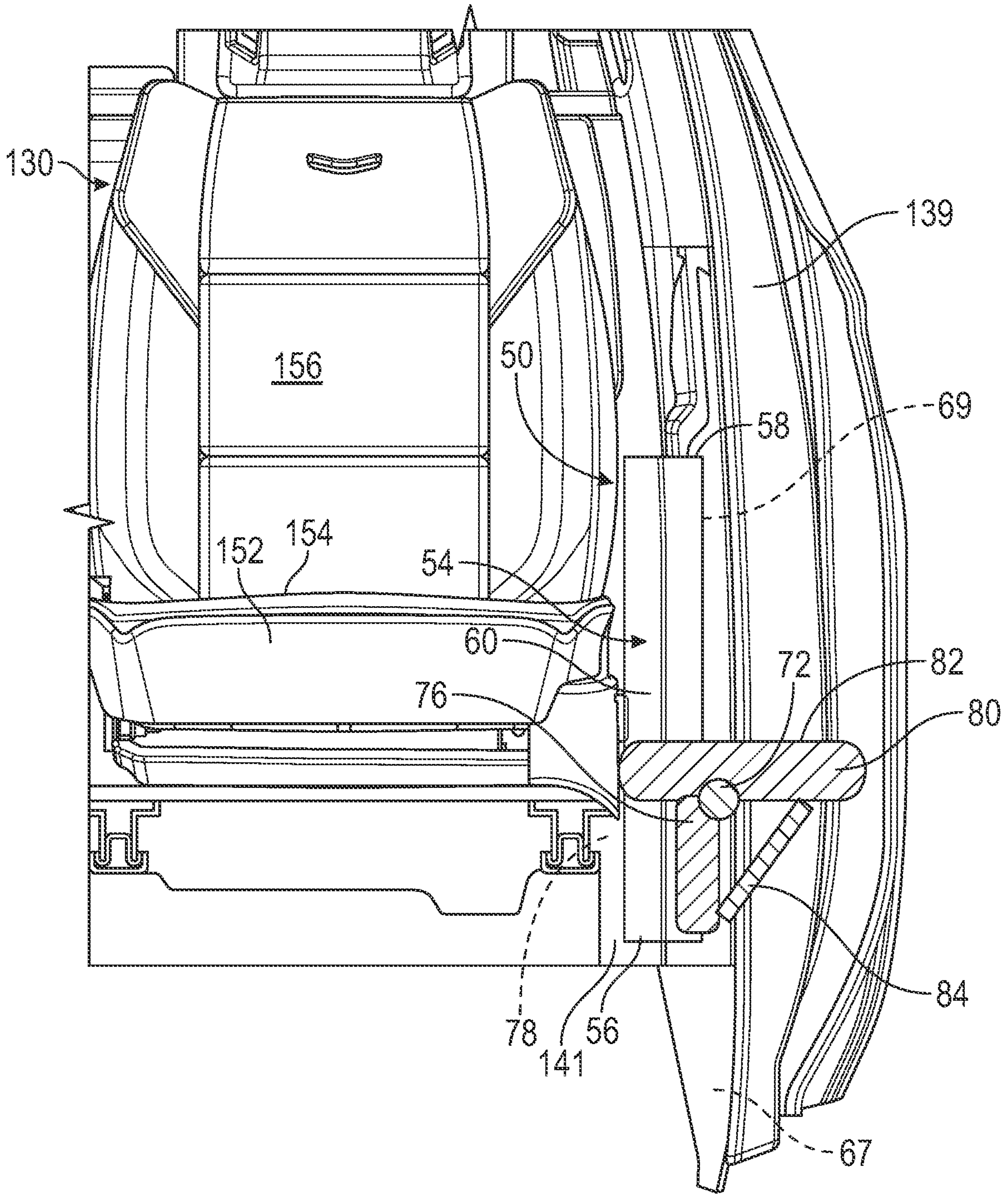
FIG. 11 is a front view of the entry and egress system of FIG. 10 in an occupant transfer position, in accordance with a non-limiting example.
Figure 12:
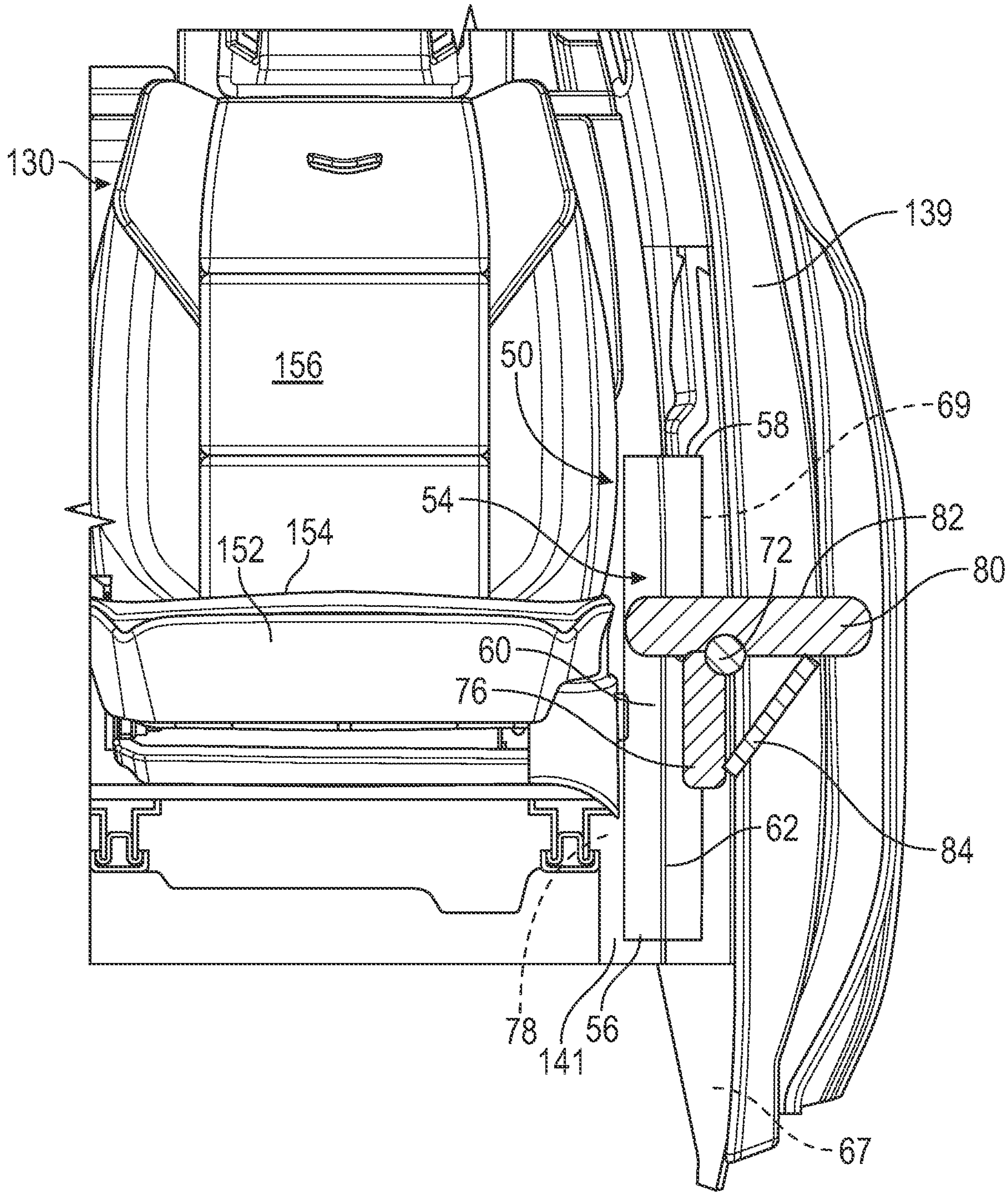
FIG. 12 is a front view of the entry and egress system of FIG. 11 in an occupant transfer position, in accordance with a non-limiting example.

At this point, a user may rest against transfer surface 82 and mount transfer board 80. Transfer board 80 may be rotated back such that transfer surface 82 is generally horizontal as shown in FIG. 11, and shuttle 76 raised as shown in FIG. 12 to locate transfer surface 82 at a position that is substantially co-planar with seat surface 154. At this point, the user may simply slide over onto seat 130 with minimal effort and interact with vehicle 10. Once in seat 130, entry/egress system 50 may be returned to the stowed configuration (FIG. 3) through an interaction with actuator 112, or following a predetermined period of time following the transfer. Egress from the vehicle is the reverse of entry. At this point, it should be understood that while transfer board 80 is shown stowed alongside seat 130, the higher clearance may allow storage below seat base 152.

Figure 13:
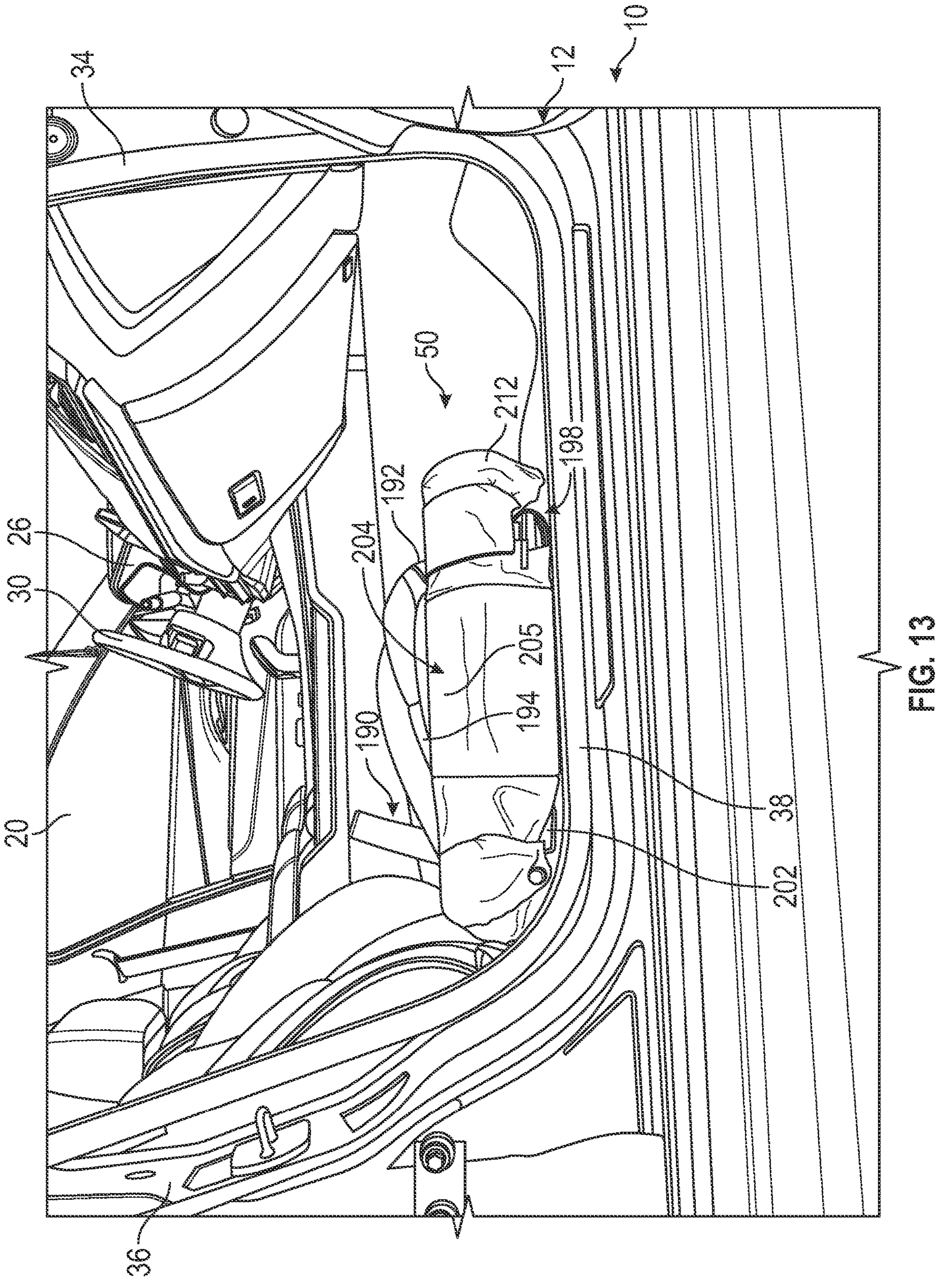
FIG. 13 is a perspective view of the vehicle of FIG. 1 including an entry/egress system shown in a user transfer position, in accordance with another non-limiting example.
Figure 14:
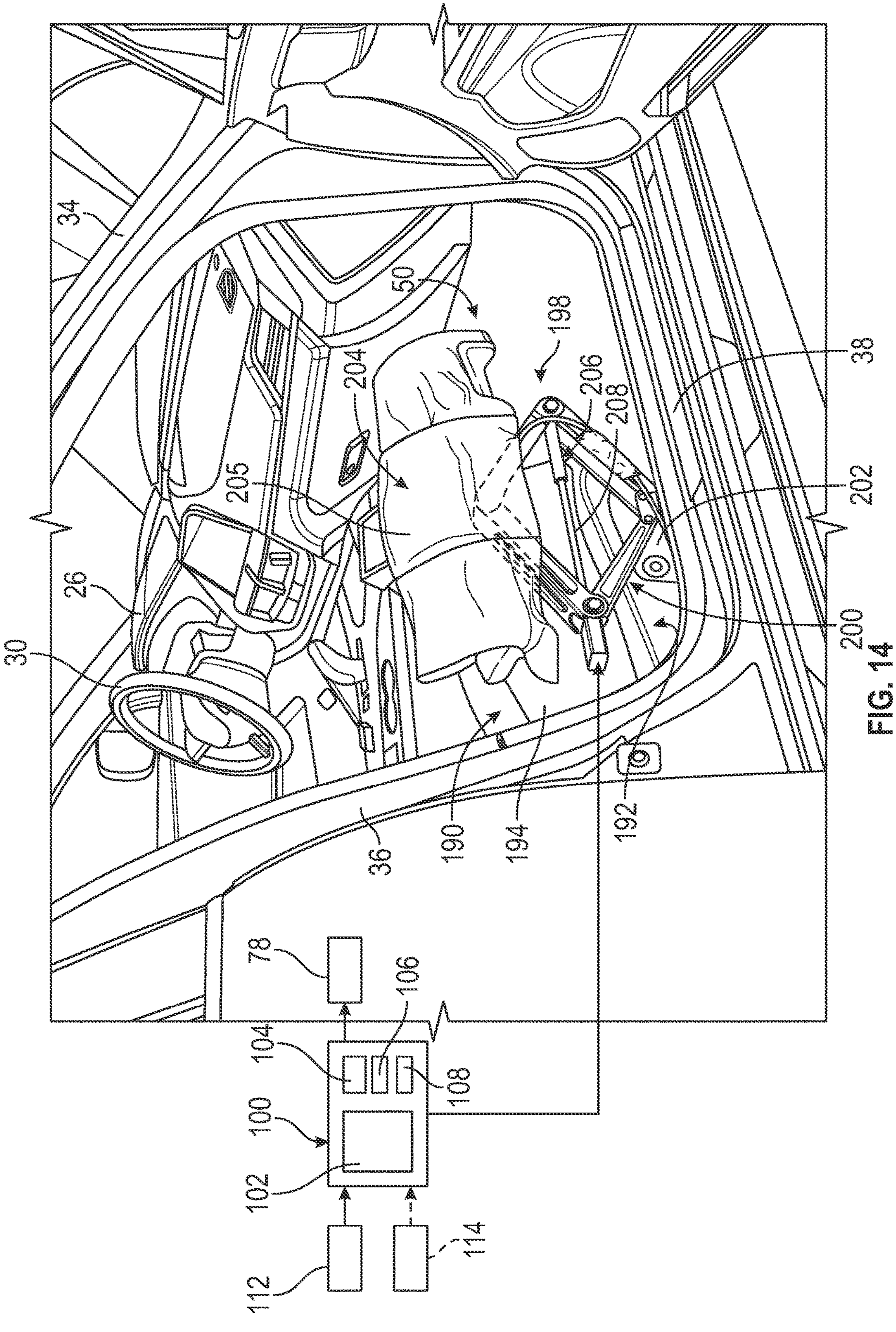
FIG. 14 is a perspective view of the entry egress system of FIG. 13 in a user entry position.

Reference will now follow to FIGS. 13 and 14 in describing entry/egress system 50 in accordance with another non-limiting example. In the non-limiting example shown, entry/egress system 50 is mounted adjacent to a front passenger seat 190 having a seat base 192 including a seat surface 194. Lift mechanism 198 takes the form of a scissor lift/jack member 200. Scissor lift 200 includes a base 202 that is mounted to horizontal structural member 38 and a support member 204 having a transfer surface 205. Scissor lift 200 includes a lifting member 206 that may take the form of a threaded rod 208 connected to actuator 78. Scissor lift 200 is encased in a flexible cover 212 that may include a pad (not shown) that serves as the transfer surface 205 and which shields a user from contact with internal components.

In a non-limiting example, scissor lift 200 may be raised, such as by detecting remote entry member 114 or through an input via actuator 112, to a user entry position (FIG. 14) allowing the user to rest on transfer surface 205. Once in position, actuator 78 may be activated to lower support member 204 such that transfer surface 205 is substantially coplanar with seat surface 194 as shown in FIG. 13 to a user transfer position allowing the user an easy, stress free entry into vehicle 10. Egress from vehicle 10 may simply be a reversal of entry.

At this point it should be understood that the entry/egress system described herein is meant to assist users with entry into a vehicle in which physical exertion is required. The system may be set up with default positions or may be programmed to specific user requirements including height positions, transfer speed, and the like. The system may be mounted and/or removed from the vehicle as user requirements change.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An entry/egress system for a vehicle comprising a seat and a door adjacent to the seat and defining a longitudinal direction, a lateral direction, and a vertical direction, the entry/egress system comprising:
- a housing mountable to a structural member in the vehicle;
- an actuator arranged at the housing, the actuator being connectable to a source of electrical power in the vehicle;
- a lift mechanism operatively connected to the actuator;
- a support member operatively connected to the lift mechanism;
- a transfer board coupled to the support member and having a support surface; and
- a control system operatively connected to the actuator,
- wherein the control system is operable to move the entry/egress system between a first configuration in which the support member is at a first vertical position and the support surface faces the lateral direction towards the door, a second configuration in which the support member is at a second vertical position and the support surface faces the vertical direction, a third configuration in which the support member is at a third vertical position and the support surface faces an oblique direction between the vertical and lateral directions, and a fourth configuration in which the support member is at the first vertical position and the support member faces the vertical direction, and
- wherein the first vertical position is lower than the second vertical position and the second vertical position is lower than the third vertical position.

2. The entry/egress system according to claim 1, wherein the transfer board is selectively rotatable relative to the support member.

3. The entry/egress system according to claim 1, further comprising a transfer board actuator connected to the transfer board.

4. The entry/egress system according to claim 3, wherein the transfer board actuator is operable to rotate the transfer board.

5. The entry/egress system according to claim 1, wherein the control system includes a wireless sensor configured to detect a vehicle remote entry member.

6. The entry/egress system according to claim 1, wherein the support member is a horizontal structural member and the lift mechanism includes a scissor lift having a base mounted to the horizontal structural member.

7. The entry/egress system according to claim 6, wherein the housing comprises a flexible cover surrounding the scissor lift.

8. A vehicle defining a longitudinal direction, a lateral direction, and a vertical direction, the vehicle comprising:
- a body including a structural member;
- a passenger compartment defined within the body, the passenger compartment including a seat arranged adjacent to the structural member;
- a door adjacent to the seat; and
- an entry/egress system arranged adjacent to the seat for facilitating entry into and egress from the passenger compartment, the entry/egress system comprising:
  - a housing mounted to the structural member;
  - an actuator arranged at the housing, the actuator being connectable to a source of electrical power in the vehicle;
  - a lift mechanism operatively connected to the actuator;
  - a support member operatively connected to the lift mechanism;
  - a transfer board coupled to the support member and having a support surface; and
  - a control system operatively connected to the actuator,
- wherein the control system is operable to move the entry/egress system between a first configuration in which the support member is at a first vertical position and the support surface faces the lateral direction towards the door, a second configuration in which the support member is at a second vertical position and the support surface faces the vertical direction, a third configuration in which the support member is at a third vertical position and the support surface faces an oblique direction between the vertical and lateral directions, and a fourth configuration in which the support member is at the first vertical position and the support member faces the vertical direction, and
- wherein the first vertical position is lower than the second vertical position and the second vertical position is lower than the third vertical position.

9. The vehicle according to claim 8, wherein the transfer board is selectively rotatable relative to the support member.

10. The vehicle according to claim 8, further comprising a transfer board actuator connected to the transfer board.

11. The vehicle according to claim 10, wherein the transfer board actuator is operable to rotate the transfer board.

12. The vehicle according to claim 8, wherein the control system includes a wireless sensor configured to detect a vehicle remote entry member.

13. The vehicle according to claim 12, wherein the support member is a horizontal structural member and the lift mechanism includes a scissor lift having a base mounted to the horizontal structural member.

14. The vehicle according to claim 13, wherein the housing comprises a flexible cover surrounding the scissor lift.

15. The vehicle according to claim 8, wherein each of the lift mechanism, the support member, and the transfer board is entirely forward of a rearmost portion of the seat.

16. The vehicle according to claim 8, wherein, in the first configuration, the transfer board is positioned directly between the seat and the door.

17. A method of facilitating entry into and egress from a vehicle comprising a seat and a door adjacent to the seat and defining a longitudinal direction, a lateral direction, and a vertical direction, the method comprising:

detecting a user accessing the vehicle, the vehicle comprising an entry/egress system comprising a support member and a transfer board coupled to the support member, the transfer board having a support surface; and moving the entry/egress system between a first configuration in which the support member is at a first vertical position and the support surface faces the lateral direction towards the door, a second configuration in which the support member is at a second vertical position and the support surface faces the vertical direction, a third configuration in which the support member is at a third vertical position and the support surface faces an oblique direction between the vertical and lateral directions, and a fourth configuration in which the support member is at the first vertical position and the support member faces the vertical direction, wherein the first vertical position is lower than the second vertical position and the second vertical position is lower than the third vertical position.

18. The method of claim 17, wherein moving the entry/egress system includes activating a lift mechanism mounted to a vehicle support surface in response to detecting the user accessing the vehicle.

19. The method according to claim 18, wherein each of the lift mechanism, the support member, and the transfer board is entirely forward of a rearmost portion of the seat.

20. The method according to claim 17, wherein, in the first configuration, the transfer board is positioned directly between the seat and the door.

* * * * *